(12) United States Patent
Hu et al.

(10) Patent No.: US 11,066,506 B2
(45) Date of Patent: Jul. 20, 2021

(54) POLYMER COMPOSITION AND COATINGS PREPARED FROM THE SAME

(71) Applicant: NIPSEA TECHNOLOGIES PTE LTD, Singapore (SG)

(72) Inventors: Jian Hu, Singapore (SG); Shaofeng Wang, Singapore (SG); Swee How Richard Seow, Singapore (SG)

(73) Assignee: NIPSEA TECHNOLOGIES PTE LTD, Singapore (SG)

( * ) Notice: Subject to any disclaimer, the term of this patent is extended or adjusted under 35 U.S.C. 154(b) by 4 days.

(21) Appl. No.: 15/551,159

(22) PCT Filed: Mar. 17, 2016

(86) PCT No.: PCT/SG2016/050123
§ 371 (c)(1),
(2) Date: Aug. 15, 2017

(87) PCT Pub. No.: WO2016/148652
PCT Pub. Date: Sep. 22, 2016

(65) Prior Publication Data
US 2018/0022857 A1    Jan. 25, 2018

(30) Foreign Application Priority Data

Mar. 17, 2015   (SG) .......................... 10201502049U

(51) Int. Cl.
| | | |
|---|---|---|
| *C09D 175/06* | (2006.01) | |
| *C08G 59/04* | (2006.01) | |
| *C09D 201/00* | (2006.01) | |
| *C08G 18/28* | (2006.01) | |
| *C08G 83/00* | (2006.01) | |
| *C09D 163/00* | (2006.01) | |
| *C08G 18/42* | (2006.01) | |
| *C08G 18/06* | (2006.01) | |
| *C08G 18/75* | (2006.01) | |
| *C08L 101/00* | (2006.01) | |
| *C08L 101/06* | (2006.01) | |
| *C09D 201/06* | (2006.01) | |
| *C09D 201/02* | (2006.01) | |

(52) U.S. Cl.
CPC ......... *C08G 18/2845* (2013.01); *C08G 18/06* (2013.01); *C08G 18/4288* (2013.01); *C08G 18/755* (2013.01); *C08G 59/04* (2013.01); *C08G 83/00* (2013.01); *C08L 101/005* (2013.01); *C08L 101/06* (2013.01); *C09D 163/00* (2013.01); *C09D 175/06* (2013.01); *C09D 201/005* (2013.01); *C09D 201/02* (2013.01); *C09D 201/06* (2013.01)

(58) Field of Classification Search
CPC .............. C08G 18/2845; C08G 18/06; C08G 18/4288; C08G 18/755; C08G 59/04; C08G 83/00; C09D 163/00; C09D 175/06; C09D 201/005; C08L 101/06
See application file for complete search history.

(56) References Cited

U.S. PATENT DOCUMENTS

| | | | | |
|---|---|---|---|---|
| 5,663,247 | A | 9/1997 | Sörensen et al. | |
| 6,093,777 | A * | 7/2000 | Sorensen | B44C 5/0469 525/167.5 |
| 6,114,489 | A * | 9/2000 | Vicari | C08G 18/4202 428/423.1 |
| 2004/0106769 | A1* | 6/2004 | Hatton | C08G 18/4261 528/403 |
| 2010/0240792 | A1* | 9/2010 | Ishizu | C08F 12/30 522/174 |

FOREIGN PATENT DOCUMENTS

WO    WO-2014/031084 A1    2/2014

OTHER PUBLICATIONS

Dhevi, D. M. et al., "Effect of new hyperbranched polyester of varying generations on toughening of epoxy resin through inter-penetrating polymer networks using urethane linkages". European Polymer Journal, Aug. 6, 2013, vol. 49, pp. 3561-3572, [Retrieved on Apr. 11, 2016] (DOI:10.1016/J.EURPOLYMJ.2013.06.041) pp. 3563-3564, Sections 2.1 Materials and 2.3 Synthesis and curing of HBP-PU/Epoxy-g-IPNs; Scheme 5.

Essenfeld, A., et al., "A New Formaldehyde-Free Etch Resistant Melamine Crosslinker". Journal of Network Polymer, Japan, Aug. 20, 2012, vol. 18, No. pages Supplement p. 131-134, [Retrieved on Apr. 11, 2016] (DOI: 10.11364/networkpolymer1996.18.supplement_131), The whole document, in particular: Introduction; Figure 2; p. 132, Coating applications; Conclusion.

Wu, K.-J., et al., "Formaldehyde-free high performance tris(alkoxycarbonylamino) triazine coatings". Progress in Organic Coatings, Dec. 5, 2001, vol. 43, pp. 167-174 [Retrieved on Apr. 11, 2016] (DOI:10.1016/S0300-9440(01)00184-9) Conclusions.

International Search Report and Written Opinion of the ISA for PCT/SG2016/050123, ISA/SG, dated Apr. 13, 2016.

International Preliminary Report on Patentability, Ch.II for PCT/SG2016/050123, IPEA/SG, Singapore, dated Mar. 10, 2017.

* cited by examiner

*Primary Examiner* — Michael L Leonard
(74) *Attorney, Agent, or Firm* — Harness, Dickey & Pierce, P.L.C.

(57) ABSTRACT

The present disclosure relates to a composition comprising: at least one dendritic polymer prepared from hyper-branched polymer with hydroxyl groups, having a plurality of peripheral functional groups, wherein the peripheral functional groups comprising at least one cyclic ether group that is covalently bound to said hyperbranched polymer by urethane linkages; and a melamine-based crosslinker. Such compositions have improved flexibility. The present disclosure further relates to the use of such compositions to form coatings after cure, or as an additive component to binder resins.

14 Claims, No Drawings

POLYMER COMPOSITION AND COATINGS PREPARED FROM THE SAME

CROSS-REFERENCE TO RELATED APPLICATIONS

This application is a 371 U.S. National Stage of International Application No. PCT/SG2016/050123, filed Mar. 17, 2016. This application claims the benefit of and priority to Singapore Patent Application No. 10201502049U, filed Mar. 17, 2015. The entire disclosures of the above applications are incorporated herein by reference.

TECHNICAL FIELD

The present invention relates to a polymer composition. The present invention further relates to the use of such polymer compositions in coating compositions or as blending additives for other binder resin systems.

BACKGROUND

In the field of protective coatings, the use of dendritic polymers is of particular interest. Dendritic polymers are a class of highly-branched polymers which can be further classified into numerous sub-groups. Two of the most important groups of dendritic polymers are dendrimers and hyperbranched polymers. Dendrimers are perfectly branched and symmetrical polymers; while hyperbranched polymers may contain a degree of imperfection at branching points (i.e., not perfectly symmetrical). The hyperbranched polymers may be substantially globular in shape.

Dendritic polymers may comprise a high number of reactive functional groups exposed at the peripheral edges of the polymer molecules. Dendritic polymers are to be distinguished from undefined or conventional polymers in that they are highly defined structures. For instance, dendritic polymers are substantially monodisperse, i.e., its polymer branches radiate outwards from a central core. In contrast, undefined polymers typically exhibit polydispersivity with their focal or branching points randomly distributed across its polymer structure. Being monodisperse or substantially monodisperse, dendritic polymers assume a spherical or substantially globular shape. This molecular conformation affords dendritic polymers unique hydrodynamic properties, in particular, e.g., the ability to provide high molecular weight but low viscosity coatings. Additionally, the structure of dendritic polymers provides a high density of functional groups disposed at the peripheral edge of the molecule. As a result, dendrimers are particularly desirable for use in the preparation of high performance protective coatings.

However, the use of dendritic polymers in coating compositions presents a number of technical problems. For instance, the high density of reactive peripheral functional groups dramatically increases its reactivity and polarity, which renders it challenging to achieve homogeneous dispersions, whether in a solvent-based or an aqueous-based system. Persons skilled in the art would also recognize the tendency for dendritic polymers to agglomerate due to their high polarity and cause phase separation in coating formulations. Therefore, while the potential benefits of using a dendritic polymer in coating compositions can be appreciated; the technical difficulties in obtaining a "workable" coating formulation is likely to discourage skilled persons from selecting dendrimers as a binder resin.

Additionally, numerous choices of crosslinkers are available to one skilled in the art for curing polymer compositions. The choice of crosslinker typically depends on the type of curing desired and the functional groups available for reaction on the polymers to be crosslinked. In this regard, melamine formaldehyde (or "melamine") compounds have been employed as crosslinking agents for numerous industrial coatings, including those comprising dendritic polymers. Reaction mechanisms between melamine compounds and hydroxyl and/or carboxyl functional resins are known in the art. Within the general class of melamine crosslinkers, of particular interest are melamine crosslinkers possessing carbamate functionality. An example of such crosslinkers is tris(alkoxycarbonylamino)triazine ("TACT"), which may be available as a commercial product marketed under the trade name Cymel® by Cytec Industries. TACT is a trifunctional melamine-based crosslinker containing reactive carbamate functionality. TACT has been employed as crosslinkers in both solvent-based and aqueous-dispersible coating compositions. A particularly useful characteristic of TACT is that it does not liberate formaldehyde upon curing. Moreover, TACT is able to react with hydroxyl/carboxyl functional resins to form urethane linkages, which may be more resistant to hydrolysis, compared to e.g., acetal linkages. Curing or baking can be performed optionally without catalysis or require only trace amounts of an acid catalyst. Surface coatings formed using melamine-based resins exhibit good hardness and chemical resistance and are well-suited for the manufacture of protective coatings.

However, it has been found that coatings prepared from polymer compositions with TACT crosslinkers tend to suffer from poor flexibility or embrittlement, e.g., in some cases, the cured coatings are unable to pass a ½ inch Mandrel test according to ASTM D522. This is especially undesirable for coatings that are intended for application onto bendable, deformable or malleable surfaces. While the addition of plasticizers or surfactants in excess may enhance the flexibility of a polymer coating, doing so leads to a reduction in physical strength, especially pencil hardness, and chemical resistance. Hence, this technical solution is equally undesirable since the coatings of interest are also required to perform a function of surface protection.

Accordingly, there is a need to provide a coating composition comprising a dendritic polymer that can overcome or at least ameliorate the technical problems discussed herein. More specifically, it is desired to provide an improved polymer coating composition comprising a melamine crosslinker or melamine-based crosslinkers. Importantly, the coating formulations disclosed herein are intended for use in the preparation of protective coatings having superior flexibility while maintaining physical and chemical properties, e.g., pencil hardness, water resistance, alkali resistance, etc.

SUMMARY

In one aspect, there is provided a composition comprising: at least one dendritic polymer having a plurality of peripheral functional groups, said peripheral functional groups comprising at least one cyclic ether group; and at least one melamine-based crosslinker.

In an embodiment, the dendritic polymer is a substantially globular, hyperbranched polymer which contains a plurality of functional groups disposed along its peripheral circumference. The hyperbranched polymer may comprise, in addition to the cyclic ether groups, other cross-linkable groups, e.g., hydroxyl functional groups, carboxyl functional groups or a mixture thereof. The hyperbranched polymer may be a second generation, third generation, fourth generation or fifth generation dendritic polymer. In other embodiments, the dendritic polymer may be selected from the group consisting of: hyperbranched polymer, dendrimer, dendrigraft, dendronized polymer, mixtures, blends and co-polymers thereof.

The total number of peripheral reactive functional groups present on the dendritic polymer is not particularly limited, provided that at least one cyclic ether group is expressed by the dendritic polymer. For instance, the dendritic polymer may be optionally modified to express other functionalities for chain extension reactions, crosslinking reactions (e.g., organosiloxane groups, isocyanate groups, carbamate groups, amino groups, carboxylate groups, etc.), ultra-violet curing capability (e.g., acrylate groups), etc.

In embodiments, the cyclic ether group is a heterocyclic group having at least three or more ring atoms, wherein at least one ring atom is oxygen. The ring may optionally comprise one or more nitrogen ring atoms. The ring structure may be saturated or unsaturated. In a particular embodiment, the cyclic ether is an epoxide, wherein one or both carbon ring atoms are optionally substituted. In one embodiment, the cyclic ether group is unsubstituted

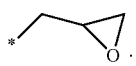 [SMILES: *CC1CO1]

In another embodiment, the cyclic ring structure may be interrupted from the attachment point * by an aliphatic group, e.g., $C_1$-$C_{12}$ aliphatic.

Unless otherwise specified, for the purpose of this specification, molecular structures of substituent moieties terminated by an asterisk "*" denotes an attachment point of the moiety to the dendritic polymer. Where molecular structures do not show substitution, unless otherwise stated, it should be understood that the valency/valencies is/are satisfied by hydrogen (H).

The melamine derivative (also termed "melamine-based crosslinker" or "melamine resin") refers to a crosslinker compound that has been chemically modified from the compound 1,3,5-triazine-2,4,6-triamine ("melamine"). In one embodiment, at least one of the three pendant amine groups of 1,3,5-triazine-2,4,6-triamine has been modified to comprise a carbamate moiety. In another embodiment, the melamine derivative comprises at least two or three carbamate moieties. In some embodiments, more than three carbamate moieties can be expressed. The melamine resin may consist solely of TACT. In other embodiments, the melamine resin may a mixture of melamine resins including TACT.

That is, in one embodiment, the melamine derivative is a TACT, having the following formula (I):

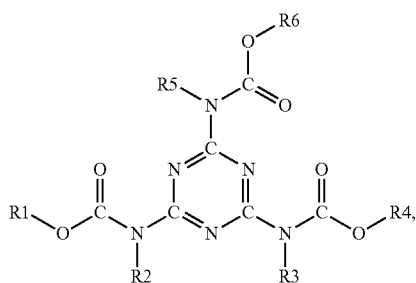

wherein each of R1 to R6 are independently H, $NR^7R^8$, or aliphatic. The aliphatic may comprise 1 to 12, 1 to 10, 1 to 8, 1 to 6, 1 to 4, 2 to 12, 2 to 10, 2 to 8, 2 to 6, 2 to 4, 3 to 12, 3 to 10, 3 to 8, or 3 to 6 carbon atoms. The aliphatic may be unsaturated; and wherein R7 and R8 are independently H, aliphatic, alkoxy, or carbamate. In some embodiments, each of R1, R4 and R6 is independently C1-6 alkyl, such as methyl or butyl.

In certain embodiments, in addition to TACT, at least one or more additional melamine formaldehyde ("MF") resins may be provided in the disclosed composition as additional crosslinker compounds. The additional MF resins/crosslinkers may include, but are not limited to, MF resins expressing imino functionality, MF resins that are partially or fully alkylated, and MF resins that have been etherified with an acrylic polyol. Exemplary MF resins/MF crosslinkers may include those marketed under Resimene® by Surface Specialties Melamines, or those marketed under Cymel® by Cytec Industries. An example of an MF/acrylic polyol is Resimene CE-7103 marketed by Ineos Melamines. An appropriate mixture of MF resins/crosslinkers can be selected based on the desired chemistry but such mixtures may include at least a TACT crosslinker as disclosed herein.

In one embodiment, the dendritic polymer comprises from about 8 to about 128 total peripheral functional groups comprising hydroxyl functional groups and epoxy groups, provided that the dendritic polymer contains at least one peripheral epoxy groups. In other embodiments, the total number of peripheral functional groups including epoxy groups is about 8, 16, 32, 64, 128 or in a range selected from any two integers disclosed herein (e.g., 8-16, 8-32, 8-64, 16-64, etc.).

Advantageously, coatings prepared from the dendritic polymer compositions disclosed herein have been found to exhibit surprising flexibility as measured by ASTM D522. Specifically, coatings prepared according to the polymer compositions disclosed herein may achieve a pass at least in the ½ inch, ¼ inch, or the ⅛ inch test as measured according to ASTM D522. In particular, the flexibility of the prepared coating is markedly superior when compared to coatings prepared from melamine-based resins containing hyperbranched or dendritic polymers which are not modified with cyclic ether groups or epoxy groups. Also advantageously, it has also been unexpectedly found that a combination of an epoxy-modified, dendritic polymer with a MF crosslinker mixture comprising TACT, provides coatings with superior flexibility and/or chemical resistance even when compared to coatings prepared from epoxy-functional polymers and MF resins. Even more advantageously, it has been found that the improved flexibility does not come at the expense of physical hardness or reduction of resistance to organic or aqueous solvents. In embodiments, the coatings disclosed herein are found to exhibit pencil hardness (scratch/break) of from H/3H to 4H/5H as measured according to ASTM D3363.

Accordingly, in one aspect, the present invention relates to a surprising discovery that a dendritic polymer which has been modified to express epoxy functionality is advantageously suited for use in a melamine crosslinking system without suffering from embrittlement. Furthermore, the epoxy-modified dendritic polymer can be employed either as a base resin or as a polymer blend/additive to another polymer (dendritic or non-dendritic) composition for improving the flexibility of a resultant coating. Advantageously, it has been found that the addition of the disclosed epoxy-modified dendritic polymer additive to a base resin composition, even in a small amount of from about 1% to 15% by total weight of the resin composition, is sufficient to improve flexibility and chemical resistance of a resultant coating.

Hence, in yet another aspect, there is provided a method of preparing a coating composition, the method comprising mixing a polymer composition with a melamine derivative, wherein the polymer composition comprises at least one dendritic polymer expressing at least two peripheral cyclic ether groups.

In yet another one embodiment, the dendritic polymer comprises peripheral hydroxyl functional groups and the at least one peripheral cyclic ether groups. The melamine derivative is such as one disclosed herein comprising at least one, two or three carbamate functional groups. In one embodiment, the melamine formaldehyde is TACT.

In another aspect, there is provided a method of providing a coating on a surface, the method comprising: blending a polymer composition as disclosed herein with a polymer resin composition; applying said polymer resin composition to a surface; and curing said polymer resin composition.

In still another aspect, there is provided a method of improving the flexibility of a coating, the method comprising: i) blending an epoxy-modified dendritic polymer with a polymer resin comprising melamine-derivatives as crosslinkers; ii) curing the blended resin to form the coating.

DEFINITIONS

The following words and terms used herein shall have the meaning indicated:

The term 'dendritic polymer' includes both 'dendrimers' and 'hyperbranched polymers' within the broad family of dendritic polymers. In certain embodiments, the term 'dendritic polymer' includes solely hyperbranched polymers. The term 'dendrimer' refers to a dendritic polymer having a symmetrical globular shape that results from a controlled process giving an essentially monodisperse molecular weight distribution. The term 'hyperbranched polymer' refers to a dendritic polymer having a certain degree of asymmetry and may possess a polydisperse molecular weight distribution. In certain instances, the hyperbranched polymer has a globular shape. Hyperbranched polymers of the present disclosure may be exemplified by those marketed by Perstorp under the trademarks Boltorn H20™, Boltorn H30™, Boltorn H40™, etc.

The term "generation" or "generation number" as used herein to refer to a dendritic polymer denotes the number of focal points on a radial axis of a dendrimer molecule, starting from its centre core to the peripheral edge of the dendritic polymer molecule. For instance, a first generation (G1) dendritic polymer would theoretically have eight peripheral functional groups, a second generation (G2) dendritic polymer would theoretically have sixteen peripheral functional groups, a third generation (G3) dendritic polymer would theoretically have thirty-two peripheral functional groups, and so forth. It should be noted that the theoretical numbers are stated for convenience and for ease of understanding. A skilled person would expect minor variations in reality due to imperfect dendron formation.

The dendritic/hyperbranched polymers of the present disclosure are substantially monodisperse or polydisperse and are characterized by a dispersity [Mw/Mn] of greater than or equal to 1, e.g., from 1 to 1.8, from 1 to 1.5, or from 1 to 1.3. The dispersity (or also known as polydispersity index, PDI) may depend on the generation of the dendritic polymer (typically approaches 1 as the generation increases). The dispersity of a dendritic polymer according to the present disclosure may be selected from 1.1, 1.2, 1.3, 1.4, 1.5, 1.6, 1.7, 1.8, or 1.9, and may have a hydroxyl value ranging from 300 to 550 mg KOH/g, 300 to 340 mg KOH/g, 470 to 500 mg KOH/g, or 490 to 530 mg KOH/g.

As used herein, the term "aliphatic" refers to an organic compound or radical characterized by a straight chain or branched chain structure, or closed ring structure, any of which may contain saturated carbon bonds, and optionally, one or more unconjugated carbon-carbon unsaturated bonds, such as a carbon-carbon double bond. For the purposes of this invention, the term "aliphatic" also includes "alicyclic" compounds defined hereinafter. The aliphatic groups may have from 1 to 24 carbon atoms e.g., 1, 2, 3, 4, 5, 6, 7, 8, 9, 10, 11, 12, 13, 14, 15, 16, 17, 18, 19, 20, 21, 22, 23, 24 carbon atoms.

As used herein, the term "alkyl" includes within its meaning monovalent ("alkyl") and divalent ("alkylene") straight chain or branched chain saturated aliphatic groups having from 1 to 12 carbon atoms, e.g., 1, 2, 3, 4, 5, 6, 7, 8, 9, 10, 11 or 12 carbon atoms. For example, the term alkyl includes, but is not limited to, methyl, ethyl, 1-propyl, isopropyl, 1-butyl, 2-butyl, isobutyl, tert-butyl, amyl, 1,2-dimethylpropyl, 1,1-dimethylpropyl, pentyl, isopentyl, hexyl, 4-methylpentyl, 1-methylpentyl, 2-methylpentyl, 3-methylpentyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, 2-ethylpentyl, 3-ethylpentyl, heptyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, 1,1,3-trimethylbutyl, 5-methylheptyl, 1-methylheptyl, octyl, nonyl, decyl, undecyl, dodecyl and the like. All alkyl groups defined in the present specification, unless otherwise indicated, may also be optionally substituted.

The term "alcohol" includes within its meaning a group that contains one or more hydroxyl moieties.

The term "alkoxy" or variants such as "alkoxide" as used herein refers to an —O— alkyl group. Representative examples include, for example, methoxy, ethoxy, n-propoxy, isopropoxy, tert-butoxy, and the like.

The term "aryl", or variants such as "aromatic group" or "arylene" as used herein refers to monovalent ("aryl") and divalent ("arylene") single, polynuclear, conjugated and fused residues of aromatic hydrocarbons having from 6 to 10 carbon atoms. Such groups include, for example, phenyl, biphenyl, naphthyl, phenanthrenyl, and the like. Aryl groups may be optionally substituted.

The term "amino" includes an amine group (i.e., —NH2) or a substituted amine group.

The term "carbocycle", or variants such as "carbocyclic ring" as used herein, includes within its meaning any stable 3, 4, 5, 6, or 7-membered monocyclic or bicyclic or 7, 8, 9, 10, 11, 12, or 13-membered bicyclic or tricyclic, any of which may be saturated, partially unsaturated, or aromatic. Examples of such carbocycles include, but are not limited to, cyclopropyl, cyclobutyl, cyclopentyl, cyclohexyl, cycloheptyl, adamantyl, cyclooctyl, [3.3.0]bicyclooctane, [4.3.0]bicyclononane, [4.4.0]bicyclodecane (decalin), [2.2.2]bicyclooctane, fluorenyl, phenyl, naphthyl, indanyl, adamantyl, or tetrahydronaphthyl (tetralin). Preferred carbocycles, unless otherwise specified, are cyclopropyl, cyclobutyl, cyclopentyl, cyclohexyl, phenyl, naphthyl, and indanyl. When the term "carbocycle" is used, it is intended to include "aryl". Unless otherwise indicated, carbocycles may be optionally substituted.

As used herein, the term "alkenyl" refers to divalent straight chain or branched chain unsaturated aliphatic groups containing at least one carbon-carbon double bond and having from 2 to 6 carbon atoms, e.g., 2, 3, 4, 5 or 6 carbon atoms. For example, the term alkenyl includes, but is not limited to, ethenyl, propenyl, butenyl, 1-butenyl, 2-butenyl, 2-methylpropenyl, 1-pentenyl, 2-pentenyl, 2-methylbut-1-enyl, 3-methylbut-1-enyl, 2-methylbut-2-enyl, 1-hexenyl, 2-hexenyl, 3-hexenyl, 2,2-dimethyl-2-butenyl, 2-methyl-2-hexenyl, 3-methyl-1-pentenyl, 1,5-hexadienyl and the like. Alkenyl groups may be optionally substituted.

The term "heterocycle" includes within its meaning a group comprising a covalently closed ring wherein at least one atom forming the ring is a carbon atom and at least one atom forming the ring is a heteroatom. Heterocyclic rings may be formed by three, four, five, six, seven, eight, nine, or more than nine atoms, any of which may be saturated, partially unsaturated, or aromatic. Any number of those atoms may be heteroatoms (i.e., a heterocyclic ring may comprise one, two, three, four, five, six, seven, eight, nine, or more than nine heteroatoms). Herein, whenever the number of carbon atoms in a heterocycle is indicated (e.g., C1-C6 heterocycle), at least one other atom (the heteroatom) must be present in the ring. Designations such as "C1-C6 heterocycle" refer only to the number of carbon atoms in the ring and do not refer to the total number of atoms in the ring. It is understood that the heterocyclic ring will have additional heteroatoms in the ring. In heterocycles comprising two or more heteroatoms, those two or more heteroatoms may be the same or different from one another. Heterocycles may be optionally substituted. Binding to a heterocycle can be at a heteroatom or via a carbon atom. Examples of heterocycles include heterocycloalkyls (where the ring contains fully saturated bonds) and heterocycloalkenyls (where the ring contains one or more unsaturated bonds) such as, but are not limited to the following:

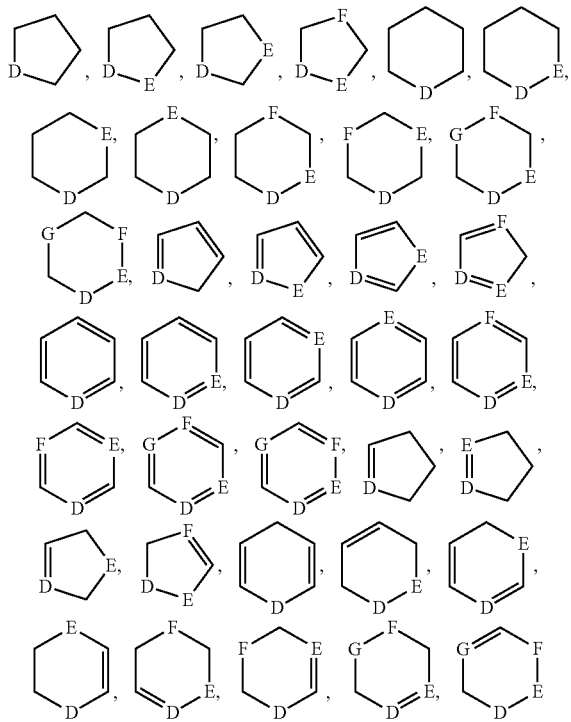

wherein D, E, F, and G independently represent a heteroatom. Each of D, E, F, and G may be the same or different from one another.

The term "imine" includes within its meaning the reaction product of an amine or ammonia and an aldehyde or ketone. This reaction results in a molecule with at least one C=N group.

The term "ring" refers to any covalently closed structure.

When compounded chemical names, e.g. "arylalkyl" and "arylimine" are used herein, they are understood to have a specific connectivity to the core of the chemical structure. The group listed farthest to the right (e.g. alkyl in "arylalkyl"), is the group that is directly connected to the core. Thus, an "arylalkyl" group, for example, is an alkyl group substituted with an aryl group (e.g. phenylmethyl (i.e., benzyl)) and the alkyl group is attached to the core. An "alkylaryl" group is an aryl group substituted with an alkyl group (e.g., p-methylphenyl (i.e., p-tolyl)) and the aryl group is attached to the core.

The term "heteroalkyl" as used herein refers to an alkyl moiety as defined above, having one or more carbon atoms, for example 1, 2, 3, 4, 5, 6, 7, 8, 9, 10 carbon atoms, replaced with one or more heteroatoms, which may be the same or different, where the point of attachment to the remainder of the molecule is through a carbon atom of the heteroalkyl radical, or the heteroatom. Suitable heteroatoms include O, S, and N. Non-limiting examples include ethers, thioethers, amines, hydroxymethyl, 3-hydroxypropyl, 1,2-dihydroxyethyl, 2-methoxyethyl, 2-aminoethyl, 2-dimethylaminoethyl, and the like. Heteroalkyl groups may be optionally substituted.

The term "heteroaryl" as used herein refers to an aromatic monocyclic or multicyclic ring system comprising about 5 to about 14 ring atoms, preferably about 5 to about 10 ring atoms, in which one or more of the ring atoms is an element other than carbon, for example nitrogen, oxygen or sulfur, alone or in combination. "Heteroaryl" may also include a heteroaryl as defined above fused to an aryl as defined above. Non-limiting examples of suitable heteroaryls include pyridyl, pyrazinyl, furanyl, thienyl, pyrimidinyl, pyridone (including N-substituted pyridones), isoxazolyl, isothiazolyl, oxazolyl, thiazolyl, pyrazolyl, furazanyl, pyrrolyl, pyrazolyl, triazolyl, 1,2,4-thiadiazolyl, pyrazinyl, pyridazinyl, quinoxalinyl, phthalazinyl, oxindolyl, imidazo[1,2-a]pyridinyl, imidazo[2,1-b]thiazolyl, benzofurazanyl, indolyl, azaindolyl, benzimidazolyl, benzothienyl, quinolinyl, imidazolyl, thienopyridyl, quinazolinyl, thienopyrimidyl, pyrrolopyridyl, imidazopyridyl, isoquinolinyl, benzoazaindolyl, 1,2,4-triazinyl, benzothiazolyl and the like. The term "heteroaryl" also refers to partially saturated heteroaryl moieties such as, for example, tetrahydroisoquinolyl, tetrahydroquinolyl and the like. Heteroaryl groups may be optionally substituted.

Unless otherwise defined, the term "cyclic group" as used herein refers to an aryl, heteroaryl, cycloalkyl, cycloalkenyl or heterocycle as defined above. Cyclic groups may be optionally substituted.

The term "optionally substituted" as used herein means the group to which this term refers may be unsubstituted, or may be substituted with one or more groups other than hydrogen provided that the indicated atom's normal valency is not exceeded, and that the substitution results in a stable compound. Such groups may be, for example, halogen, hydroxy, oxo, cyano, nitro, alkyl, alkoxy, haloalkyl, haloalkoxy, arylalkoxy, alkylthio, hydroxyalkyl, alkoxyalkyl, cycloalkyl, cycloalkylalkoxy, alkanoyl, alkoxycarbonyl, alkylsulfonyl, alkylsulfonyloxy, alkylsulfonylalkyl, arylsulfonyl, arylsulfonyloxy, arylsulfonylalkyl, alkylsulfonamido, alkylamido, alkylsulfonamidoalkyl, alkylamidoalkyl, arylsulfonamido, arylcarboxamido, arylsulfonamidoalkyl, arylcarboxamidoalkyl, aroyl, aroylalkyl arylalkanoyl, acyl, aryl, arylalkyl, or alkylaminoalkyl.

Any carbon or heteroatom with unsatisfied valences in the text, schemes, examples, structural formulae, and any Tables herein is assumed to have the hydrogen atom or atoms to satisfy the valences.

The expression "aqueous-dispersible", in the context of the present specification, is interchangeably used with the expressions "aqueous-borne", "aqueous-based", "water-based" or "water-dispersible", and which describes a polymer composition that is either substantially or completely miscible or dispersible in an aqueous medium such as water.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Illustrative embodiments of the polymer compositions and methods of use as disclosed herein will now be described in greater detail.

The present disclosure provides a composition comprising at least one dendritic or hyperbranched polymer having a plurality of peripheral functional groups, said peripheral functional groups comprising at least one cyclic ether group; and a melamine-based crosslinker.

In embodiments disclosed herein, the dendritic polymer is a hyperbranched polymer, and in specific embodiments, a substantially globular, hyperbranched, hydroxyl-terminated polyester polyol that has been modified with at least one epoxy group. In one embodiment, the epoxy-modified dendritic polymer may be represented by Formula IIA:

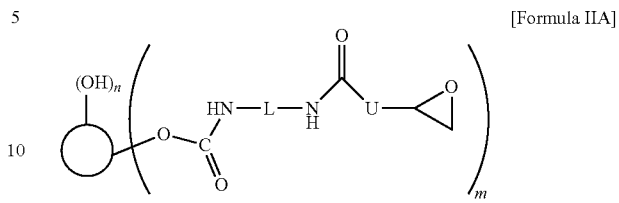

wherein

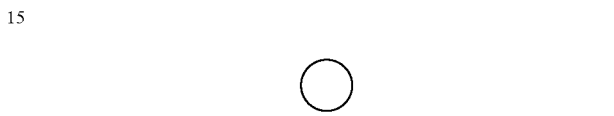

represents the backbone of dendritic polymer; L denotes a linker group comprised by the backbone of an isocyanate; U refers to a linker moiety between the diisocyanate and the epoxy functional group; 2≤m+n≤total number of peripheral functional groups of hyperbranched polymer; m and n are positive integers. In particular, the epoxy group is attached to the dendritic polymer by two carbamate/urethane linkages interrupted by a linker moiety L.

The integer m is at least 1. It will be appreciated that the value of m and n depends on the total number of reactive peripheral functional groups in the dendritic polymer. In embodiments, about 1%, 5%, 10%, 15%, 20%, 25%, 30%, 35%, 40%, 45% or 50% of the peripheral functional groups are epoxy groups. As example, for a second generation dendritic polymer, m may be an integer from about 1 to 8. For a third generation dendritic polymer, m may be from about 1 to 16. The value of n can thus be calculated accordingly. In exemplary, non-limiting embodiments of the present disclosure, the extent of epoxy functionalization is about 25% or about 50%.

An exemplary synthesis route of the above epoxy-modified dendritic polymer may involve an initial reaction of an alcohol epoxy with an isocyanate compound to thereby form an intermediate or precursor compound expressing at least one unreacted isocyanate group and at least one terminal epoxy group.

In one embodiment, the alcohol epoxy may be represented by

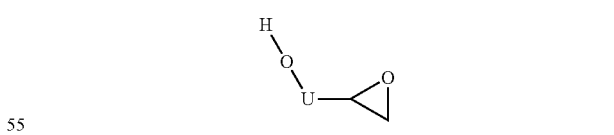

[Formula III], wherein U is $C_{1-12}$ aliphatic, alkylene, or alkynyl. In one embodiment, the alcohol epoxy is glycidol, i.e., when U is methylene ($CH_2$). The precursor compound may also be formed by reacting an epoxy compound having at least one additional functional group that is reactive with an isocyanate group. In another embodiment, the epoxy compound is glycerol diglycidyl ether.

The isocyanate compound may be selected from diisocyanates, triisocyanates, or isocyanurates. In one embodiment, a diisocyanate is used to prepare the intermediate compound. Exemplary diisocyanates may include but are not limited to hexamethylene diisocyanate (HDI), toluene diisocyanate (TDI), isophorone diisocyanate (IPDI), methylene diphenyl diisocyanate (MDI). In one embodiment, the isocyanate compound is a diisocyanate having the general formula: O=C=N-L-N=C=O [Formula IV], wherein L is selected from the group consisting of: alkyl, cycloalkyl, aryl, and substituted aryl. In embodiments, L is selected from optionally substituted aliphatic $C_{1-6}$ alkyl, optionally substituted $C_3$-$C_8$ cycloalkyl, methylbenzene, or diphenyl. In one embodiment, the cycloalkyl may be a $C_3$-$C_8$ cycloalkyl substituted with $C_{1-3}$ alkyl at two or more ring carbons. In embodiments, L may be selected from the group consisting of:

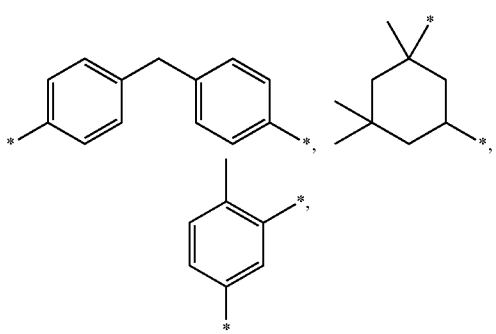

2,6-tolylene, and

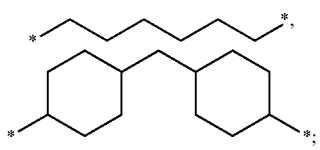

wherein * denotes attachment point to the —N=C=O group.

During formation of the intermediate compound, one of the two —NCO groups of the diisocyanate reacts with the alcohol group of the alcohol epoxy compound to thereby form a carbamate linkage, resulting in the formation of the intermediate compound as disclosed herein.

The unreacted isocyanate (—NCO) group of the intermediate compound may be reacted with a peripheral —OH group of the dendritic polymer to form a second or further carbamate/urethane linkage, thereby providing the terminal epoxy group as shown in Formula IIA.

It will be appreciated that the above described reaction mechanism can be generically applied for grafting various moieties onto the dendritic polymer via the formation of appropriate intermediate compounds having at least one cross-linkable group (e.g., isocyanate group) and the functional group/moiety of interest. The present disclosure contemplates the use of such reaction mechanisms to provide an epoxy-modified polymer which can be optionally grafted with other functionalities.

In certain embodiments, the epoxy-modified dendritic polymer may be further esterified with $C_6$-$C_{18}$, C8-C12, C8-C10, or a C10-C12 fatty acids. In particular, the epoxy-modified dendritic polymer may have the following Formula IIB:

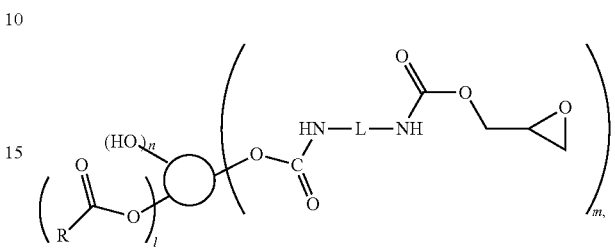

wherein m, n, and L are as defined for Formula IIA, where R is a $C_8$-$C_{12}$ aliphatic; and wherein (m+n+l)=(total theoretical number of peripheral functional groups). In embodiments, the integer l of Formula IIB is about 10 to about 30, about 10 to about 25, or about 12 to about 25 for a third generation dendritic polymer (i.e., where m+n+l=64). Therefore, where an epoxy-modified dendritic polymer of Formula IIB is used, about 15%, 20%, 25%, 30%, 35%, 40%, or 45% of the peripheral functional groups are —OC(O)R.

In yet another embodiment, prior to or concurrent with being grafted with epoxy functional groups, the dendritic polymer undergoes chain extension by reaction with a hydroxyl carboxylic acid or a lactone of a hydroxyl carboxylic acid, or a combination thereof. In other embodiments, the dendritic polymer may be chain-extended to express at least one functional group reactive with a crosslinker group such as an isocyanate group.

For the chain extension step, the dendritic polymer may be heated until it forms a polymer melt at about 80° C. to 140° C., 100° C. to 120° C., or 120° C. to 140° C. The polymer melt is then mixed with a caprolactone and stirred until the caprolactone is consumed. Notably, after chain extension, the total number of peripheral hydroxyl groups is unchanged from before chain extension. In one particular embodiment, a chain-extended, epoxy-modified dendritic polymer has the following [Formula IIC]:

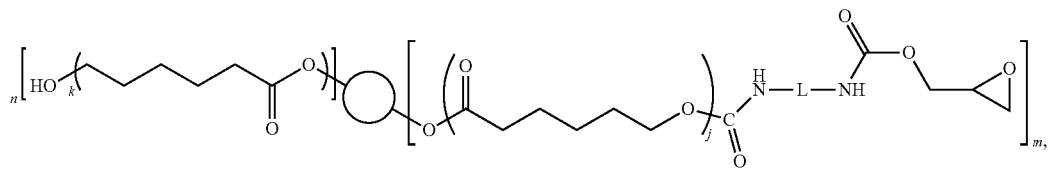

wherein m, n, j, k are positive integers, wherein (m+n)= (total theoretical number of peripheral functional groups); wherein j and k denotes the number of

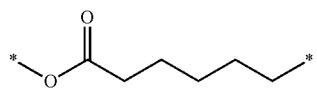

repeating blocks.

The melamine-based crosslinker or melamine derivative as disclosed herein may comprise at least one, at least two or three carbamate moieties that are crosslinkable with hydroxyl or epoxy or both. In a particular embodiment, the melamine-based crosslinker is TACT. The TACT may comprise methoxy and butoxy side groups.

Also disclosed herein is method for making a coating composition, the method comprising mixing a polymer composition with a melamine derivative, wherein the polymer composition comprises at least one dendritic polymer that expresses at least one peripheral cyclic ether group. The cyclic ether group may be an epoxy group. In non-limiting embodiments of the method, the dendritic polymer is selected to express about 25% to 50% epoxy groups based on the total number of peripheral reactive groups.

The polymer composition may comprise, in addition to the epoxy-modified dendritic polymer, one or more distinct polymers. The polymer composition may comprise one or more additional polymers, e.g., polyesters, polyacrylates, polyester polyols, polyurethanes, polycarbonates, polyamides, co-polymers, or blends thereof. In one embodiment, the additional polymer, co-polymers, or blends thereof is selected to be reactive with or cross-linkable by the melamine derivative or the melamine-based crosslinkers as disclosed herein.

The additional polymer component may be provided as a major binder component. The additional polymer component may be a dendritic polymer, a hyperbranched polymer, a straight chain polymer, copolymers or polymer blends thereof. In one embodiment, the binder component comprising the additional polymer, co-polymers, or blends thereof is provided in an amount of about 30 to about 60 wt. % based on the total weight of the coating composition, e.g., 35 wt. %, 40 wt. %, 45 wt. %, 50 wt. %, 55 wt. %, and 60 wt. %. In certain embodiments, the binder is provided in an amount of about 40 wt % to about 50 wt. %.

When provided as an additive or as a minor component, the epoxy-modified dendritic polymer may be provided in a relatively small amount of from 1 wt. % to about 20 wt. % based on the total weight of the coating composition, e.g., 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, and 20 wt. %. When used as an additive, the additive could be formulated as an epoxy-functionalized dendritic polymer composition without the melamine-based crosslinker and added to or blended with an existing melamine system. Alternatively, the epoxy-functionalized dendritic polymer composition can be provided as an additive composition comprising the melamine-based crosslinker.

Advantageously, it has been found that the addition of a relatively small amount of epoxy-modified dendritic polymer (wherein about 25% to 50% of the peripheral functional groups are epoxy groups) surprisingly and unexpectedly improved the flexibility of a coating prepared from the coating composition. In particular embodiments, the flexibility performance has been observed to improve from a ½ inch (fail) to a ⅛ inch (pass) according to ASTM D522 based on an addition of approximately 5 wt. % of the epoxy-modified dendritic polymer. In certain embodiments, it has been advantageously observed that addition of the epoxy-modified dendritic polymer in an amount of from about 1 wt % to about 20 wt. %, from about 1 wt % to about 10 wt. %, or from about 5 wt. % to about 10 wt. % by weight of total coating composition, significant improvements to the chemical resistance (at least two to greater than threefold increase in the total number of methyl ethyl ketone ["MEK"] rubs) can be achieved concurrently with the improved flexibility. Also advantageously, the pencil hardness (scratch) improved from F to at least H or 2H.

In yet another embodiment, the present disclosure also contemplates a coating composition comprising, as a single binder component, the epoxy-modified dendritic polymer and at least one melamine-based crosslinker such as TACT. Advantageously it has been found that a coating prepared therefrom exhibits surprisingly superior pencil hardness relative to coating compositions comprising the epoxy-modified dendritic polymer as a minor or additive component.

In other embodiments, there is provided a method of preparing a coating composition, the method comprising a step of: mixing a binder composition with a melamine crosslinker comprising at least one carbamate moiety; wherein the binder composition comprises a dendritic polymer having at least one peripheral cyclic ether group.

In embodiments, the melamine-based crosslinker or melamine derivative may be a TACT compound comprising at least three carbamate moieties as disclosed herein.

In embodiments, the dendritic polymer is an epoxy-modified dendritic polymer as disclosed herein. The binder composition may contain additional dendritic or non-dendritic polymers selected from polyesters, polyester polyols, polyurethanes, polyacrylates, polyamides, co-polymers, and blends thereof. The additional polymers may be hydroxyl functional polymers. In embodiments, the epoxy-modified dendritic polymer is provided in an amount of about from about 5% to about 20% by weight based on the weight of the coating composition. In other embodiments, the epoxy-modified dendritic polymer is provided in an amount of about from about 1% to about 20%, from about 1% to about 10%, from about 5% to about 20%, or from about 5% to about 10%, by weight based on the weight of the coating composition. In other embodiments, the epoxy-functional dendritic polymer is about 10% to about 20% (based on solid contents) of the binder composition. For example, the binder may comprise as a major component, a hydroxyl functional resin and as a minor component, an epoxy-modified dendritic polymer. The ratio of the major resin component and the epoxy-modified dendritic polymer may be from about 9:1 to about 3:2 (based on solid contents), e.g., about 9:1 about 4:1, about 7:3, and about 3:2.

The binder composition may consist of or consists essentially of the epoxy-modified dendritic polymer. Where the binder consists essentially of the dendritic polymer, the dendritic polymer may be provided in an amount of about 40 wt % to about 50 wt % of said coating composition.

In embodiments where the binder comprises additional polymers/resins other than the epoxy-modified dendritic polymer, the binder may be provided in an amount of about from about 50% to about 80%, from about 50% to about 70%, from about 50% to about 60%, from about 60% to about 70% or about 60% to 80%, by weight based on the weight of the coating composition.

The method may involve the use of at least one catalyst, e.g., 4-(dimethylamino)pyridine (DMAP) catalyst during said mixing step. The catalyst may also be a tertiary amine or a quaternary ammonium catalyst.

Mixing may be carried out via physical mixing methods, e.g., stirring, mechanical blending, sonication, spinning and combinations thereof.

The method may further comprise adding into the coating composition, one or more additives selected from the group consisting of: solvents, organic solvents, defoamers, and surfactants.

Another aspect of the disclosure relates to a method of providing a coating on a surface, the method comprising: providing a coating composition as disclosed herein or as prepared according to the methods disclosed above; applying the obtained coating composition to a surface; and curing said coating composition. The curing may be thermal curing undertaken at temperatures from about 100° C. to 200° C., including but not limited to, 110° C., 120° C., 130° C., 140° C., 150° C., 160° C., 170° C., 180° C. and 190° C. The curing temperature may be dependent on the cure time. For example, for a curing time of 8 hours, a curing temperature of 140±20° C. may be appropriate, whereas at a curing temperature of 230±20° C., the curing period may be from about 10 to about 20 seconds.

Another aspect of the disclosure relates to a method of improving the flexibility of a coating, the method comprising: i) blending a dendritic polymer having at least one terminal epoxy functional group with a binder resin, said binder resin comprising a melamine crosslinker; ii) curing the blended resin to form the coating. The blending step may be characterized by blending said epoxy-modified dendritic polymer into said binder resin in an amount of from 5 wt % to 15 wt % based on the total weight of the blended resin. The binder resin may comprise a mixture of melamine crosslinkers. In one embodiment, the binder resin comprises TACT crosslinkers as disclosed herein. In another embodiment, the binder resin may comprise TACT as the sole crosslinker. The binder resin may comprise one or more additional polymers other than the epoxy-modified dendritic polymer. The additional polymers may comprise hydroxyl and/or acrylate functionality. In embodiments, the blending step may comprise mixing the epoxy-modified dendritic polymer with the one or more additional polymers to form the binder resin, wherein the weight ratio (by solids content) of the additional polymer(s) to the epoxy-modified dendritic polymer is from about 9:1 to about 4:1.

EXAMPLES

Non-limiting examples of the invention and comparative examples will be further described in greater detail by reference to specific Examples, which should not be construed as in any way limiting the scope of the invention.

Materials Used

Below is a list of the raw materials used in the following Examples. The commercial names or their abbreviations of the following raw chemicals will be used in the Examples for convenience.

(1) Boltorn H20 (H20): Hyperbranched polyester-polyol with theoretically 16 peripheral hydroxyl groups, having a molecular weight of about 2100 g/mol, and a hydroxyl number of 490 to 530 mgKOH/g, procured from Perstorp Singapore Pte Ltd.

(2) Boltorn H40 (H40): Hyperbranched polyester-polyol with theoretically 64 peripheral hydroxyl groups, having a molecular weight of about 5100 g/mol solid, OH value 470-500 mgKOH/g, procured from Perstorp Singapore Pte Ltd.

(3) Boltorn H4001 (H4001): light yellow liquid, the solid content being 50%-55%, provided by Perstorp Company, the derivative of the fourth generation hyperbranched polyester, and about 20%-40% hydroxyls are esterified by $C_8$-$C_{12}$ saturated fatty acid. The hydroxyl value is 300-340 mgKOH/g by solid content, and the acid value is 2-8 mgKOH/g. Mn=3600, Mw=8200.

(4) CYMEL NF2000 (NF2000): Tris(alkoxycarbonylamino) triazine (TACT), A trifunctional melamine-based crosslinker containing reactive carbamate functionality. Its solid content is 48-52%, provided by Cytec Industries Inc.

(5) Desmophen A 870 BA (A870): A polyisocyanate cross-linking acrylic resin, 70% in BA, with approximate 4.2% OH content on solid, provided by Nuplex.

(6) Surfynol DF110C: A non-ionic defoamer provided by Air Products.

(7) DMAP: 4-(dimethylamino)pyridine purchased from Sigma Aldrich (8) ECOSURF BD405: a non-ionic alcohol ethoxylate surfactant provided by Dow Chemicals.

(9) Proglyde DMM: dipropylene glycol dimethyl ether provided by Dow Chemicals.

Testing Methods

In the following Examples, the following industrially recognized testing methods are used to characterize the water-dispersible coatings:

Adhesion (1 mm×1 mm): ASTM D3359;
Pencil Hardness (Break/Scratch): ASTM D3363;
Flexibility (⅛"): ASTM D522;
Tensile Strength (Elongation): ASTM D412

In addition, the following protocol will be adopted for the methyl ethyl ketone ("MEK") rub test: (1) prepare a film on a glass panel with 100 μm wet film thickness ("WFT"); (2) dry the panel at a predetermined temperature for a predetermined duration (temperature and curing time depend on specific coatings) prior to testing; (3) saturate a cotton bud with MEK and hold it at 45° angle to the test surface, rub the test surface with moderate pressure. A complete rub consisting of one forwards rub and one backwards rub motion is considered one double rub. The surface is rubbed continuously until the substrate glass panel is exposed. Record the total number of double rubs.

Example 1

Preparation of an Epoxy-Modified Dendritic Polymer H4001-25% IPDI-Glycidol [4$^{th}$ Generation Dendritic Polymer, 25% Epoxy Substitution]

(1A) Preparation of IPDI-Glycidol Adduct in Butyl Acetate

Under a nitrogen atmosphere, at room temperature ("RT"), with stirring, glycidol (8.15 g) was added over 30 min into a mixture of IPDI (24.45 g), butyl acetate ("BA") (32.3 g) and dibutyltin dilaurate ("DBTDL") (0.326 g). The stirring was continued for 2 h until the NCO % of the reaction mixture reached theoretical value of 7.1%. An IPDI-glycidol adduct was formed as intermediate compound.

(1B) Preparation of H4001-25% IPDI-Glycidol

In a nitrogen atmosphere, the IPDI-glycidol adduct solution (50.0 g) was added into H4001 (118.0 g) at 80° C. over 30 min. The stirring was continued at the same temperature for about 3 h until the NCO % was less than 0.1%.

Example 2

Preparation of an Epoxy-Modified Dendritic Polymer H4001-50% IPDI-Glycidol [4$^{th}$ Generation, 50% Epoxy Substitution]

In a nitrogen atmosphere, IPDI-glycidol adduct solution (57.7 g, as described in Example 1) was added into H4001 (68.1 g) at 80° C. over 30 min. The stirring was continued at the same temperature for about 5 h until the NCO % was less than 0.1%.

Example 3

Preparation of an Epoxy-Modified Dendritic Polymer: H20-40% Capa-25% IPDI-Glycidol [$2^{nd}$ Generation Dendritic Polymer, Chain Extended, 25% Epoxy Substitution]

(3A) Chain Extension of Boltorn H20 with 40 wt. % of Caprolactone (H20-40% Capa)

Under nitrogen atmosphere, Boltorn H20 (95.0 g) and DMM (95.0 g) were mixed and heated to 135-140° C. with stirring until Boltorn H20 was complete melted and a suspension was formed. Caprolactone (38.0 g) was then added and the resulting mixture was stirred at the same temperature for 1 h until all caprolactone was consumed as monitored by GC.

(3B) Preparation of IPDI-Glycidol Adduct in DMM

In a nitrogen atmosphere, glycidol (32.0 g) was added into a mixture of IPDI (80.0 g), DMM (32.0 g) and DBTDL (0.15 g) with stirring over 20 min at RT. The resulting mixture was stirred at RT for about 2 h until NCO % reached the theoretical value of 8.4%. The IPDI-Glycidol adduct was used with one day of preparation.

(3C) Preparation of H20-40% Capa-25% IPDI-Glycidol

In a nitrogen atmosphere, IPDI-Glycidol adduct in DMM (45.1 g) was added into H20-40% capa (121.3 g) at 80° C. over 30 min. The resulting mixture was stirred at 80 degree for about 3 h until NCO % was less than 0.1%.

Example 4

Preparation of an Epoxy-Modified Dendritic Polymer: H20-40% Cap-50% IPDI-Glycidol [2nd Generation, Chain Extended, 50% Epoxy Substitution]

In a nitrogen atmosphere, IPDI-Glycidol adduct in DMM (77.4 g, as described in 3B) was added into H20-40% capa (104.1 g, as described in Example 3A) at 80° C. over 30 min. The resulting mixture was stirred at 80° C. for about 4 h until NCO % was less than 0.1%.

Example 5

Preparation of an Epoxy Dendritic Polymer: (H40-25% IPDI-Glycidol)

(5A) Preparation of IPDI-Glycidol Adduct in Cyclohexanone

In a nitrogen atmosphere, at RT, glycidol (12.96 g) was added into a mixture of IPDI (38.90 g), cyclohexanone (51.45 g) and DBTDL solution (0.52 g, 10% solution in BA). The resulting mixture was stirred at RT for about 3 hours until NCO % reached theoretical value of 7.1%.

(5B) Preparation of H40-25% IPDI-Glycidol

In a nitrogen atmosphere, Boltorn H40 (36.0 g) was dissolved in cyclohexanone (36.0 g) were mixed and heated to 110° C. to afford a clear solution. The solution was then cooled down to 80° C., followed by addition of IPDI-Glycidol adduct in cyclohexanone (47.5 g) over 30 min. The reaction was stirred for about 4 h at the same temperature until NCO % was less than 0.1%.

Example 6

Preparation of an Epoxy-Dendritic Polymer: H40-50% IPDI-Glycidol [$4^{th}$ Generation, 50% Epoxy Substitution]

In a nitrogen atmosphere, IPDI-Glycidol adduct in cyclohexanone (95.0 g, as described in Example 5) was added into a 50 wt. % solution of Boltorn H40 in cyclohexanone (72 g, as described in Example 5) at 80° C. over 30 min. The mixture was stirred at the same temperature for about 5 h until NCO % was less than 0.1%.

Exemplary Formulations 1-15

Coating formulations 1 to 15 have been prepared according to the components and materials listed in Tables 1-10 below.

Formulations 1, 8 and 12 are comparative formulations prepared without the epoxy-modified dendritic polymer of the present disclosure. The performance of the coatings prepared from the various formulations are tabulated and compared under Tables 8, 9 and 10.

Preparation of a Typical Formulation and Film Application:

As shown in Table 1, A870 (51.6 wt %), Cymel NF 2000 (26.9 wt %), miscellaneous additives (total 0.8 wt %), catalyst (DMAP, 0.1 wt %) and solvent butanol (to adjust the final NV % to 50%) were mixed thoroughly. The mixture was then applied to glass and tin panels using a wire-bar with 100 μm wet film thickness (WFT). Panels were dried at RT for 15 min then in an oven at 150° C. for 30 min. The films obtained appeared clear and glossy. Pencil hardness, flexibility and MEK double rub tests were then carried out with these panels.

TABLE 1

Formulation 1

| Entry | Materials | Weight percentage (%) | Weight (g) |
|---|---|---|---|
| 1 | A870 | 51.6 | 15.00 |
| 2 | Butanol | 20.6 | 6.00 |
| 3 | Surfynol DF110C | 0.2 | 0.058 |
| 4 | BYK345 | 0.2 | 0.058 |
| 5 | ECOSURF BD405 | 0.4 | 0.115 |
| 6 | DMAP | 0.1 | 0.029 |
| 7 | Cymel NF2000 | 26.9 | 7.826 |
| | Total | 100 | 29.086 |

TABLE 2

Formulation 2

| Entry | Materials | Weight percentage (%) | Weight (g) |
|---|---|---|---|
| 1 | Example 3 | 47.6 | 15.00 |
| 2 | Butanol | 12.9 | 4.050 |
| 3 | Surfynol DF110C | 0.2 | 0.062 |
| 4 | BYK345 | 0.2 | 0.062 |
| 5 | ECOSURF BD405 | 0.4 | 0.125 |
| 6 | DMAP | 0.1 | 0.031 |
| 7 | Cymel NF2000 | 38.6 | 12.162 |
| | Total | 100 | 31.492 |

TABLE 3

Formulation 3

| Entry | Materials | Weight percentage (%) | Weight (g) |
|---|---|---|---|
| 1 | Example 4 | 50.3 | 15.00 |
| 2 | Butanol | 16.7 | 4.980 |
| 3 | Surfynol DF110C | 0.2 | 0.059 |
| 4 | BYK345 | 0.2 | 0.059 |
| 5 | ECOSURF BD405 | 0.4 | 0.118 |
| 6 | DMAP | 0.1 | 0.030 |
| 7 | Cymel NF2000 | 32.1 | 9.574 |
| | Total | 100 | 29.82 |

TABLE 4

Formulation 4

| Entry | Materials | Weight percentage (%) | Weight (g) |
|---|---|---|---|
| 1a | A870 | 46.2 | 13.5 |
| 1b | Example 3 | 5.7 | 1.654 |
| 2 | Butanol | 20.5 | 6.000 |
| 3 | Surfynol DF110C | 0.2 | 0.058 |
| 4 | BYK345 | 0.2 | 0.058 |
| 5 | ECOSURF BD405 | 0.4 | 0.115 |
| 6 | DMAP | 0.1 | 0.029 |
| 7 | Cymel NF2000 | 26.8 | 7.826 |
| | Total | 100 | 29.24 |

TABLE 5

Formulation 5

| Entry | Material | Weight percentage (%) | Weight (g) |
|---|---|---|---|
| 1a | A870 | 40.8 | 12.000 |
| 1b | Example 3 | 11.3 | 3.307 |
| 2 | Butanol | 20.4 | 6.000 |
| 3 | Surfynol DF110C | 0.2 | 0.058 |
| 4 | BYK345 | 0.2 | 0.058 |
| 5 | ECOSURF BD405 | 0.4 | 0.115 |
| 6 | DMAP | 0.1 | 0.029 |
| 7 | Cymel NF2000 | 26.6 | 7.826 |
| | Total | 100 | 29.393 |

TABLE 6

Formulation 6

| Entry | Material | Weight percentage (%) | Weight (g) |
|---|---|---|---|
| 1a | A870 | 46.3 | 13.5 |
| 1b | Example 4 | 5.4 | 1.577 |
| 2 | Butanol | 20.6 | 6.000 |
| 3 | Surfynol DF110C | 0.2 | 0.058 |
| 4 | BYK345 | 0.2 | 0.058 |
| 5 | ECOSURF BD405 | 0.4 | 0.115 |
| 6 | DMAP | 0.1 | 0.029 |
| 7 | Cymel NF2000 | 26.8 | 7.826 |
| | Total | 100 | 29.163 |

TABLE 7

Formulation 7

| Entry | Material | Weight percentage (%) | Weight (g) |
|---|---|---|---|
| 1a | A870 | 41.0 | 12.00 |
| 1b | Example 4 | 10.8 | 3.153 |
| 2 | Butanol | 20.5 | 6.000 |
| 3 | Surfynol DF110C | 0.2 | 0.058 |
| 4 | BYK345 | 0.2 | 0.058 |
| 5 | ECOSURF BD405 | 0.4 | 0.115 |
| 6 | DMAP | 0.1 | 0.029 |
| 7 | Cymel NF2000 | 26.8 | 7.826 |
| | TOTAL | 100 | 29.239 |

TABLE 8

Film properties of Formulations 1-7

| Formulation | Pencil hardness (mark/break) | Flexibility (Mandrel test) | MEK double rub (cycles) | Adhesion (% peel-off) |
|---|---|---|---|---|
| 1 [Comparative] | F/3H | ½ fail | 440 | 0 |
| 2 | 3H/4H | ⅛ pass | >1500 | 0 |
| 3 | 4H/5H | ⅛ pass | >1500 | 0 |
| 4 | H/3H | ⅛ pass | >1500 | 0 |
| 5 | 2H/4H | ⅛ pass | >1500 | 0 |
| 6 | 2H/4H | ⅛ pass | >1500 | 0 |
| 7 | 2H/4H | ⅛ pass | 1098 | 0 |

The above data indicates that the TACT crosslinker (CYMEL NF2000) reacts with both hydroxyl and epoxy functional resins at about 125° C. In Formulations 1 to 3, CYMEL NF 2000 is used to react with A870, the epoxy-modified dendritic polymers of Examples 3 and 4 respectively.

The coating film of comparative Formulation 1 (prepared with A870) showed fair pencil hardness of F/3H (scratch/break), and reasonably good MEK resistance with 440 cycles. However, the flexibility is markedly poor and the comparative film does not even pass a ½ inch Mandrel test. In contrast, coating films prepared from Formulations 2 and 3 comprising the disclosed epoxy-functionalized dendritic polymer demonstrated improved pencil hardness (scratch/break) to 3H/4H and 4H/5H, respectively. Additionally, the MEK resistance of the inventive coating films are also clearly superior with >1500 cycles as compared to the comparative film (440 cycles). Even more notably, the film flexibilities of the inventive coating films also experienced drastic improvements from a ½ fail to ⅛ pass in the Mandrel test.

Use of Epoxy-Modified Dendritic Polymer as Additive Blend

As shown in Formulations 4 to 7, even when a small amount of A870 (about 10 wt % to about 20% based on solid content) was replaced with the epoxy-modified dendritic polymer [obtained from Example 3 or 4], the resultant coating films benefitted from much improved physical and chemical properties compared to the comparative Formulation 1.

In Formulation 4, about 5.6 wt. % of the epoxy-modified dendritic polymer from Example 3 was added to the formulation containing about 46.2 wt. % of the main binder A870. The weight ratio of A870 to Example 3 was about 9:1 (based on solid content). The resulting coating film shows pencil hardness of H/3H, and passed the ⅛ inch Mandrel test. Importantly, the coating film did not show any visible damage with 1500 cycles of MEK rub.

In Formulation 5, about 11.2 wt. % of the epoxy-modified dendritic polymer from Example 3 was added to the formulation containing about 40.8 wt. % of the main binder A870. The weight ratio of A870 to Example 3 was about 4:1 (based on solid content). The pencil hardness of the resultant coating film is further improved to 2H/4H (scratch/break) and the flexibility is maintained with passing ⅛ inch Mandrel test.

In Formulations 6 and 7, similarly advantageous results can be observed by the addition of a small portion (5.4 wt. % and 10.8 wt. % respectively) of the epoxy-modified dendritic polymer from Example 4 to the formulation containing A870 as the main binder. The resultant films displayed greatly improved pencil hardness, flexibility and MEK resistance.

Additional Formulations 8 to 11

Additional films were prepared based on the protocol described above using Formulations 8-11 (shown below in Table 9). Final NV %=55%, adjusted by BA. WFT=100 μm, RT flash 15 min, 150 degree, 30 min or 1 h. DMAP used as catalyst.

TABLE 9

| Formulation | 8(Comparative) | 9 | 10 | 11 |
|---|---|---|---|---|
| Dendritic polymer of Example 1 | 0 g | 1.327 g | 2.760 g | 15.00 g |
| CYMEL NF 2000 | 7.819 g | 7.934 g | 8.208 g | 9.042 g |
| A870 | 15.00 g | 13.68 g | 12.33 g | 0 g |
| Film properties | | | | |
| MEK (30 min) | 61 | 70 | 100 | 195 |
| MEK (1 h) | 230 | 366 | 408 | >1500 |
| Hardness (30 min) | H/2H | 2H/2H | 2H/2H | 2H/3H |
| Hardness (1 h) | 2H/3H | 2H/3H | 3H/3H | 3H/3H |
| Flexibility(30 min) | ⅛ | ⅛ | ⅛ | ⅛ |
| Flexibility (1 h) | ⅝ | ½ | ⅛ | ⅛ |

The data in Table 9 investigates the addition of the epoxy-modified, carboxylic acid esterified, dendritic polymer of Example 1 into an A870/Cymel NF2000 ("TACT") system. The results confirm that the addition of the dendritic polymer according to the present disclosure improves the hardness and flexibility of the film. It is postulated that the dendritic polymer of Example 1 crosslinks with Cymel NF2000 to give a film with excellent MEK resistance (>1500) good hardness (3H/3H) and flexibility (⅛ pass).

Additional Formulations 12 to 15

Additional films were prepared using the protocol as described above based on Formulations 12 to 15. Final NV=55%, adjusted by BA. WFT 100 μm, RT flash 15 min, 150° C. thermal cure, 30 min or 1 h. DMAP used as catalyst. The contents of each formulation are provided in Table 10.

TABLE 10

| | Formulations | | | |
|---|---|---|---|---|
| | 12 (comparative) | 13 | 14 | 15 |
| Example 2 | 0 g | 14.993 g | 1.495 g | 3.010 g |
| Cymel NF2000 | 7.839 g | 6.698 g | 7.832 g | 7.815 g |
| A870 | 14.964 g | 0 | 13.519 g | 12.018 g |
| Film properties | | | | |
| MEK (30 min) | 318 | >1500 | 658 | 1300 |
| MEK (1 h) | 390 | >1500 | 830 | 1033 |
| Hardness(30 min) | 2H/3H | 2H/2H | 2H/2H | 2H/3H |
| Hardness (1 h) | 2H/3H | 2H/3H | 3H/3H | 3H/3H |
| Flexibility(30 min) | ⅛ | ⅛ | ⅛ | ⅛ |
| Flexibility(1 h) | ¼ | ⅛ | ¼ | ¼ |

The data found in Table 10 shows that the addition of the epoxy-modified, carboxylic acid esterified, dendritic polymer H4001-50% IPDI-Glycidol of Example 2 into A870/Cymel NF2000 system substantially improves the hardness and flexibility of the resultant coating films. The magnitude of improvement is observed to be greater than that obtained by using the epoxy-modified, chain-extended, dendritic polymer from Example 3.

The following Examples are epoxy-dendritic polymers prepared based on glycerol diglycidyl ether (which is a di-epoxy compound with one active hydroxyl group)

Additional Materials Used in Examples 7-8:
Glycerol diglycidyl ether (GDGE): purchased from Nagase ChemteX;
Iron(III) acetylacetonate: provide by TIB Chemicals;
YD-128: a liquid type standard epoxy resin derived from Bisphenol-A, provided by Kukdo Chemical.

Example 7

Preparation of an Epoxy-Dendritic Polymer: H4001-25% IPDI-Glycerol Diglycidyl Ether [4th Generation Dendritic Polymer, 25% Di-Epoxy Substitution]
(7A) Preparation of IPDI-GDGE Adduct In a nitrogen atmosphere, at RT, glycerol diglycidyl ether (GDGE) (51.73 g) was added into a mixture of IPDI (50.00 g), butyl acetate (40.00 g) and Iron(III) acetylacetonate (5.0 mg). The resulting mixture was stirred at RT for about 5 hours until NCO % reached theoretical value of 6.7%.
(7B) Preparation of H4001-25% IPDI-GDGE Under nitrogen atmosphere, at RT, freshly prepared IPDI-GDGE adduct (50.56 g) according to (7A), H4001 (120.00 g) and DBTDL (0.085 g) were mixed. The mixture was stirred at 80° C. for 2.5 hours until NCO % was less than 0.1%.

Example 8

Preparation of an Epoxy-Dendritic Polymer: H20-25% IPDI-Glycerol Diglycidyl Ether [2th Generation, 25% Di-Epoxy Substitution]
(8A) Preparation of IPDI-GDGE Adduct In a nitrogen atmosphere, at RT, glycerol diglycidyl ether (37.25 g) was added into a mixture of IPDI (30.00 g), butyl acetate (24.00 g) and Iron(III) acetylacetonate (5.0 mg). The resulting mixture was stirred at RT for about 3 hours until NCO % reached theoretical value of 5.0%.
(8B) Preparation of H20-25% IPDI-Glycidol Under nitrogen atmosphere, a mixture of Boltorn H20 (50.00 g) and DMM (25.00 g) was heated to 140° C. Caprolactone (20.00 g) was then added. The resulting mixture was stirred at the same temperature for 1 hour and was then cooled down to 80° C. Freshly prepared IPDI-GDGE adduct (75.32 g) according to (8A) and DBTDL (0.098 g) were then charged in turn. The resulting mixture was stirred at 80° C. for 3 hours until NCO % was less than 0.1%.

Exemplary Formulations
(Example 7, 8 and a Commercial Epoxy Resin YD-128)

Additional films were prepared using the protocol as described above based on Formulations 12 to 15. Final NV=50%, adjusted by butanol. WFT 100 μm, RT flash 15 min, 150° C. thermal cure, 30 min or 1 h. DMAP used as catalyst. The contents of each formulation are provided in Tables 11-17 below.

TABLE 11

| Formulation 16 (Example 7) | | | |
|---|---|---|---|
| Entry | Material | Wt (%) | Weight (g) |
| 1 | Example 7 | 60.2% | 20.000 |
| 2 | Butanol | 13.5% | 4.480 |
| 3 | Surfynol DF110C | 0.2% | 0.066 |
| 4 | BYK345 | 0.2% | 0.066 |
| 5 | ECOSURF BD405 | 0.4% | 0.132 |
| 6 | DMAP | 0.1% | 0.033 |
| 7 | Cymel NF2000 | 25.5% | 8.463 |
| Total | | 100% | 33.240 |

TABLE 12

Formulation 17 (Example 8)

| Entry | Material | Wt (%) | Weight (g) |
|---|---|---|---|
| 1 | Example 8 | 55.2% | 20.348 |
| 2 | Butanol | 15.7% | 5.779 |
| 3 | Surfynol DF110C | 0.2% | 0.073 |
| 4 | BYK345 | 0.2% | 0.073 |
| 5 | ECOSURF BD405 | 0.4% | 0.146 |
| 6 | DMAP | 0.1% | 0.037 |
| 7 | Cymel NF2000 | 28.3% | 10.435 |
| Total | | 100% | 36.891 |

TABLE 13

Formulation 18 (YD-128)

| Entry | Material | Wt (%) | Weight (g) |
|---|---|---|---|
| 1 | YD-128 | 27.7% | 10.000 |
| 2 | Butanol | 27.7% | 10.000 |
| 3 | Surfynol DF110C | 0.2% | 0.072 |
| 4 | BYK345 | 0.2% | 0.072 |
| 5 | ECOSURF BD405 | 0.4% | 0.143 |
| 6 | DMAP | 0.1% | 0.036 |
| 7 | Cymel NF2000 | 43.7% | 15.789 |
| Total | | 100% | 36.112 |

TABLE 14

Formulation 19 (A870/Example 7 9:1 wt/wt)

| Entry | Material | Wt (%) | Weight (g) |
|---|---|---|---|
| 1a | A870 (90%) | 46.4% | 18.000 |
| 1b | Example 7 | 5.9% | 2.288 |
| 2 | Butanol | 19.9% | 7.712 |
| 3 | Surfynol DF110C | 0.2% | 0.077 |
| 4 | BYK345 | 0.2% | 0.077 |
| 5 | ECOSURF BD405 | 0.4% | 0.154 |
| 6 | DMAP | 0.1% | 0.038 |
| 7 | Cymel NF2000 | 26.9% | 10.435 |
| Total | | 100% | 38.781 |

TABLE 15

Formulation 20 (A870/Example 7 8:2 wt/wt)

| Entry | Material | Wt (%) | Weight (g) |
|---|---|---|---|
| 1a | A870 | 41.3% | 16.000 |
| 1b | Example 7 | 11.8% | 4.575 |
| 2 | Butanol | 19.1% | 7.425 |
| 3 | Surfynol DF110C | 0.2% | 0.077 |
| 4 | BYK345 | 0.2% | 0.077 |
| 5 | ECOSURF BD405 | 0.4% | 0.154 |
| 6 | DMAP | 0.1% | 0.038 |
| 7 | Cymel NF2000 | 26.9% | 10.435 |
| Total | | 100% | 38.781 |

TABLE 16

Formulation 21 (A870/Example 8 9:1 wt/wt)

| Entry | Material | Wt (%) | Weight (g) |
|---|---|---|---|
| 1a | A870 | 46.4% | 18.000 |
| 1b | Example 8 | 5.6% | 2.181 |
| 2 | Butanol | 20.2% | 7.819 |
| 3 | Surfynol DF110C | 0.2% | 0.077 |
| 4 | BYK345 | 0.2% | 0.077 |
| 5 | ECOSURF BD405 | 0.4% | 0.154 |
| 6 | DMAP | 0.1% | 0.038 |
| 7 | Cymel NF2000 | 26.9% | 10.435 |
| Total | | 100% | 38.781 |

TABLE 17

Formulation 22 (A870/Example 8 8:2 wt/wt)

| Entry | Material | Wt (%) | Weight (g) |
|---|---|---|---|
| 1a | A870 | 41.3% | 16.000 |
| 1b | Example 8 | 11.2% | 4.361 |
| 2 | Butanol | 19.7% | 7.639 |
| 3 | Surfynol DF110C | 0.2% | 0.077 |
| 4 | BYK345 | 0.2% | 0.077 |
| 5 | ECOSURF BD405 | 0.4% | 0.154 |
| 6 | DMAP | 0.1% | 0.038 |
| 7 | Cymel NF2000 | 26.9% | 10.435 |
| Total | | 100% | 38.781 |

TABLE 18

Film properties of Formulations 16-18

| Formulations | 18 | 16 | 17 |
|---|---|---|---|
| Epoxy resin | YD-128 | Example 7 | Example 8 |
| MEK double rub | >1500 | >1500 | >1500 |
| Pencil hardness (scratch/break) | 3H/4H | 2H/4H | 3H/5H |
| Impact (kg cm) | 45 | 170 | 115 |
| Flexibility (Mandrel test) | 1/8 pass | 1/8 pass | 1/8 pass |
| Flexibility (mandrel test, −20° C.) | 3/8 pass | 1/4 pass | 1/8 pass |

The results in Table 18 show that the coatings prepared from Examples 16 and 17 provided superior impact resistances than that of YD-128; and their flexibilities at the temperature of −20° C. were also better.

TABLE 19

Film properties of Formulations 19-22

| Formulation | Pencil hardness (scratch/break) | Flexibility (Mandrel test) | MEK double rub (cycles) | Adhesion (% peel-off) |
|---|---|---|---|---|
| 1 [Comparative] | F/3H | 1/2 fail | 440 | 0 |
| 19 | 2H/4H | 3/8 pass | >1500 | 0 |
| 20 | 2H/4H | 1/8 pass | >1500 | 0 |
| 21 | 2H/3H | 1/8 pass | >1500 | 0 |
| 22 | 2H/4H | 1/8 pass | >1500 | 0 |

Similar to Examples 1-6, replacement of 10 wt %-20 wt % of A870 by Examples 7 and 8 improved the hardness, chemical resistances and flexibility of the coating.

APPLICATIONS

As is substantiated by the disclosure provided herein, the disclosed epoxy-modified dendritic polymer and coatings prepared from the same are capable of addressing and overcoming at least one or more technical issues associated with conventional coatings melamine resins, e.g., a lack of flexibility, pencil hardness, chemical resistance.

Accordingly, the disclosed modified dendritic polymer may be advantageously applied in industry, e.g., the provision of surface protective coatings for automotive industries, and/or surface coatings that are intended for application to deformable or bendable surfaces.

Furthermore, the disclosed polymer compositions may also be used for preparing pigments and masterbatches.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A composition comprising:
   (a) at least one epoxy-modified dendritic polyester polyol having a plurality of peripheral functional groups, said peripheral functional groups comprising:
      terminal hydroxyl functional groups, and
      at least one epoxy functional group,
      said epoxy-modified dendritic polyester polyol being represented by a compound of Formula IIA

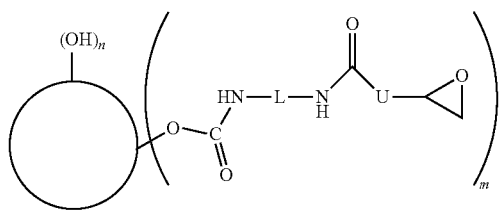

Formula IIA wherein

represents the backbone of said epoxy-modified dendritic polyester polyol, U refers to a linker moiety formed between an isocyanate linker and the epoxy functional group, m and n are positive integers, and 2≤m+n≤64, and L is selected from the group consisting of:

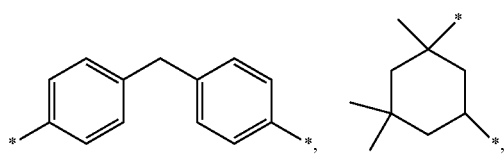

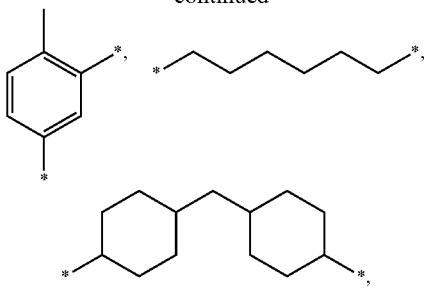

2,6-tolylene, and combinations thereof, wherein * represents an attachment point to the —N═C═O group; and (b) at least one melamine-based crosslinker, said melamine-based crosslinker is tris(alkoxycarbonylamino) triazine ("TACT"), wherein about 45% or less of said peripheral functional groups are said epoxy functional groups.

2. The composition of claim 1, wherein said epoxy-modified dendritic polyester polyol is a second generation, third generation or fourth generation dendritic polymer.

3. The composition of claim 1, wherein said peripheral hydroxyl groups are esterified with a C6-18 fatty acid.

4. The composition of claim 1, wherein said epoxy-modified dendritic polyester polyol has been chain extended to express at least one peripheral functional group reactive with said crosslinker group.

5. The composition of claim 1, wherein from about 25% to about 45% of the peripheral functional groups are said epoxy functional groups.

6. The composition of claim 1, wherein said epoxy functional groups are covalently bound to said epoxy-modified dendritic polyester polyol by urethane linkages.

7. The composition of claim 1, wherein the melamine-based crosslinker is present in an amount of about 20% to about 40% by weight of the composition.

8. The composition of claim 1, further comprising:
   about 30 wt. % to about 60 wt. % of a binder resin, said binder resin comprising a polymer selected from the group consisting of polyacrylates, polyesters, polyols, polyester polyols, polyurethanes, polycarbonates, polyamides, co-polymers and blends thereof; and
   wherein epoxy-modified dendritic polyol polyester is present in an amount of from 5 wt. % to 15 wt. %.

9. A method of preparing a coating composition, the method comprising a step of:
   mixing a binder composition with at least one melamine-based crosslinker said melamine-based crosslinker is tris(alkoxycarbonylamino)triazine ("TACT");
   wherein the binder composition comprises at least one epoxy-modified dendritic polyester polyol having a plurality of peripheral functional groups, said peripheral functional groups comprise terminal hydroxyl functional groups and at least one epoxy functional group, said epoxy-modified dendritic polyester polyol being represented by a compound of Formula IIA Formula IIA

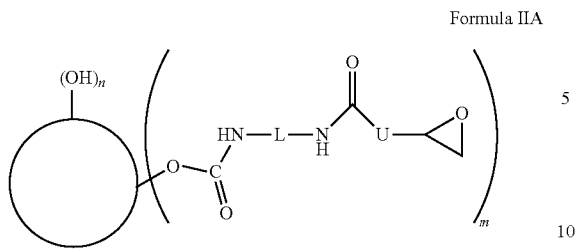

wherein

represents the backbone of said epoxy-modified dendritic polyester polyol, U refers to a linker moiety formed between an isocyanate linker and the epoxy functional group, m and n are positive integers, and $2 \leq m+n \leq 64$, and L is selected from the group consisting of:

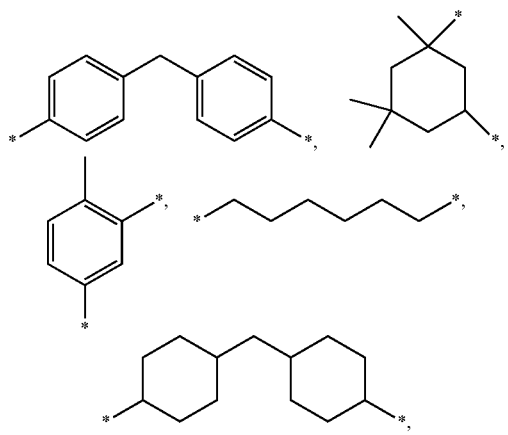

2,6-tolylene, and combinations thereof, wherein * represents an attachment point to the —N═C═O group, and
wherein about 45% or less of said peripheral functional groups are said epoxy functional groups.

10. The method of claim 9, wherein the epoxy-modified dendritic polyester polyol is provided in an amount of about 5 wt. % to about 15 wt. %, based on the weight of the coating composition.

11. The method of claim 9, wherein the binder composition consists essentially of said epoxy-modified dendritic polyester polyol.

12. A method of providing a coating on a surface, the method comprising:
providing a composition comprising:
at least one epoxy-modified dendritic polyester polyol having a plurality of peripheral functional groups, said peripheral functional groups comprising terminal hydroxyl function groups and at least one epoxy functional group, said epoxy-modified dendritic polyester polyol being represented by a compound of Formula IIA Formula IIA

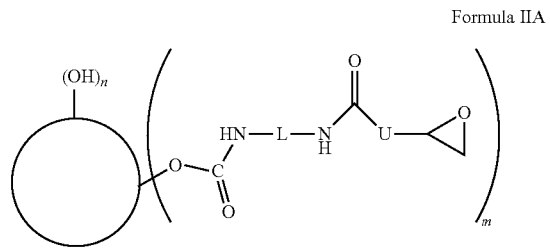

wherein

represents the backbone of said epoxy-modified dendritic polyester polyol, U refers to a linker moiety formed between an isocyanate linker and the epoxy functional group, m and n are positive integers, and $2 \leq m+n \leq 64$, and L is selected from the group consisting of:

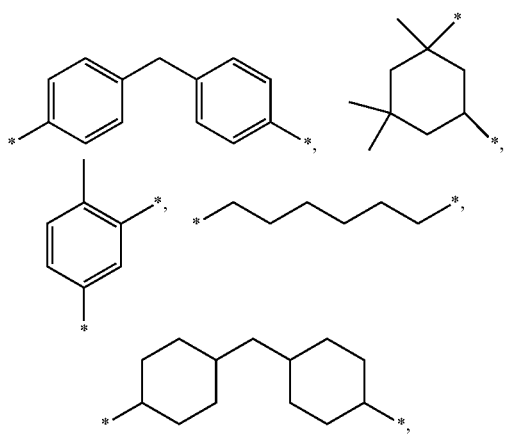

2,6-tolylene, and combinations thereof, wherein * represents an attachment point to the —N═C═O group; and
at least one melamine-based crosslinker, said melamine-based crosslinker is tris(alkoxycarbonylamino) triazine ("TACT");
wherein about 45% or less of the peripheral functional groups are said epoxy functional groups;
applying said composition to a surface; and
curing said composition.

13. The method of claim 12, wherein said curing comprises thermal curing.

14. A method of improving the flexibility of a coating, the method comprising:
i) blending an epoxy-modified dendritic polyester polyol having a plurality of peripheral functional groups with a binder resin,
said peripheral functional groups comprising terminal hydroxyl functional groups and at least one epoxy functional group,
said epoxy-modified dendritic polyester polyol being represented by a compound of Formula IIA

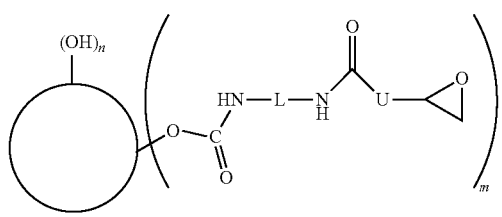

wherein

represents the backbone of said epoxy-modified dendritic polyester polyol, U refers to a linker moiety formed between an isocyanate linker and the epoxy functional group, m and n are positive integers, and 2≤m+n≤64, and L is selected from the group consisting of:

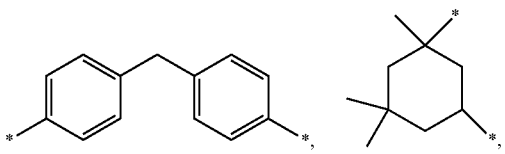

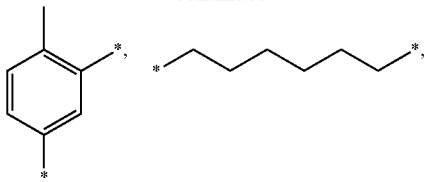

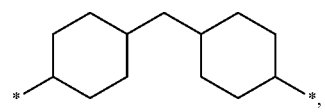

2,6-tolylene, and combinations thereof, wherein * represents an attachment point to the —N=C=O group, and said binder resin comprising at least one melamine-based resin as crosslinker, said crosslinker is tris(alkoxycarbonylamino)triazine ("TACT"), wherein about 45% or less of the peripheral functional groups are said epoxy functional groups; and ii) curing the blended resin to form the coating.

* * * * *